Figure 1:
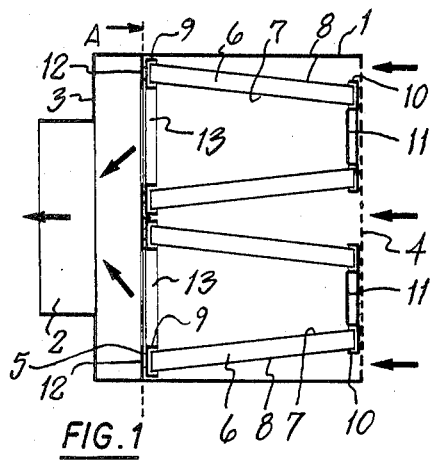

United States Patent [19]

Witchell

[11] 4,390,354
[45] Jun. 28, 1983

[54] AIR FILTERS

[76] Inventor: Stanley P. Witchell, 17 Town Close Vicarage Hill, Dartmouth, South Devon, England

[21] Appl. No.: 291,858

[22] Filed: Aug. 10, 1981

Related U.S. Application Data

[63] Continuation of Ser. No. 129,526, Mar. 12, 1980, abandoned, which is a continuation-in-part of Ser. No. 558,496, Mar. 14, 1975.

[51] Int. Cl.³ .................. B01D 29/20; B01D 29/24
[52] U.S. Cl. .................................. 55/337; 55/483; 55/484; 55/499; 55/521
[58] Field of Search .............. 55/484, 500, 529, 337, 55/483, 521, 497, 499; 210/322, 304, 323.1, 323.2, 435, 455, 493.1, 493.5, 512.1

[56] References Cited

U.S. PATENT DOCUMENTS
4,218,227  8/1980  Frey .................................... 55/521

FOREIGN PATENT DOCUMENTS
761710  11/1956  United Kingdom ................ 55/337

OTHER PUBLICATIONS
Donaldson Bulletin 1200-272; 1976.

Primary Examiner—Frank Sever
Attorney, Agent, or Firm—William A. Drucker

[57] ABSTRACT

An air cleaner comprises at least two pleated paper filter elements each having the configuration of a frustrum of a cone and mounted in side-by-side relation in a casing with their relatively wide diameter ends in sealing relation to a common, impermeable baseplate means dividing said casing into two discrete portions, said baseplate means having openings defined therein to provide direct communication between one of said portions and the insides of said elements, impermeable means for closing the relatively narrow diameter ends of the elements, together with an aperture in the casing in each of said portions, whereby in use, air entering one of said apertures can pass to the other aperture only through said filter elements. The impermeable means for closing the narrow ends of the elements is preferably a blanking plate integral with each of said ends.

9 Claims, 8 Drawing Figures

AIR FILTERS

This application is a continuation of Ser. No. 129,526, filed Mar. 12, 1980, abandoned, which is a continuation-in-part of my copending application Ser. No. 558,496 filed on Mar. 14, 1975.

This invention relates to air cleaners of the kind comprising a casing having an inlet and an outlet and a pleated paper filter element mounted inside the casing so that in use, air flows from the inlet to the outlet through the element. More specifically, it is concerned with air filters in which the filter element is generally tubular in the form of a frustrum of a cone whose open ends are arranged to abut against opposite ends of the casing in sealing relation therewith so that air flowing from inlet to outlet is constrained to pass through the tubular wall of the element.

The filter element itself is usually replaceable, the casing being divisible to permit this replacement which is effected either at regular intervals, or simply whenever the element becomes choked by whatever contaminant is being filtered out of the air. In order to maximise the time between such successive replacements it is very desirable that the wall of the element should present the greatest possible utilisable surface area for receiving the contaminant without unduly obstructing either the inlet or outlet and that the flow of contaminated air should be evenly distributed over this surface area. The first of these requirements may be met in part by making the outside of the element the inlet side for the contaminated air, but for a given casing size, the second requirement restricts the maximum possible diameter of the element. Unfortunately, the size of the casing is also very often restricted by the space available to house it, a factor which is often outside the control of the cleaner manufacturer, particular in the automotive industry.

Increasing the filter element thickness radially inwardly can yield a valuable increase in the surface area, but in the context of a restricted size of casing it may also result in the outlet being at least in part obstructed, as well as in an excessive pressure drop appearing across the element.

In the case of pleated paper, further complications arise. The peaks and troughs of the pleats usually extend axially of the element and the depth of the pleats determines the radial thickness of the element. Clearly, the spacing of the pleats and their depth greatly affects the total utilisable surface area of paper in the filter, but a much more important practical consideration is the ease with which contaminating particles can penetrate into the pleats. Too close a spacing and/or too deep a pleat results in a large surface area but one which is poorly utilized because the walls defining the pleats, especially their radially innermost regions, are too close together.

As one reduces casing diameter (for a given throughput), problems of increased pressure drop and excessive air velocities around the element, coupled with asymmetric dust distribution over the element surface manifest themselves. The increased pressure drop is the most serious problem, particularly where the first opening in the casing is tangentially directed.

According to the present invention, an air cleaner comprises at least two pleated paper filter elements each having the configuration of a frustrum of a cone and mounted in side-by-side relation in a casing with their relatively wide diameter ends in sealing relation to a common, impermeable baseplate means dividing said casing into two discrete portions, said baseplate means having openings defined therein to provide direct communication between one of said portions and the insides of said elements, impermeable means for closing the relatively narrow diameter ends of the elements, together with an aperture in the casing in each of said portions, whereby in use, air entering one of said apertures can pass to the other aperture only through said filter elements. The impermeable means for closing the narrow ends of the elements is preferably a blanking plate integral with each of said ends.

Preferably, the aperture in that portion of the casing which is in direct communication with the insides of the elements (through the openings in the baseplate means) is used as the outlet from the air cleaner, the other aperture being then the inlet. Preferably, the elements are substantially identical. The openings in the baseplate means are preferably as large as possible, at as large as the full internal diameter of the filter elements adjacent thereto. The associated aperture in the casing should be at least as large as one of the openings in the baseplate and preferably larger, say up to 30% larger.

The casing is preferably configured so that the baseplate means has the minimum practicable area, said area being approximately the same as that of one end wall of the casing. For example, using two elements, the baseplate means may be generally rectangular in shape, its width being approximately equal to the outside diameter of the relatively wide end of one element and its length being approximately twice that diameter (to accommodate the two side-by-side elements). To minimise the area of the baseplate means, the corners should be rounded so as to virtually eliminate unused area, although this is not essential. An even number of elements is preferred, simply in order to make best use of the area of the baseplate means, unless the elements are arranged in a single row. For four identical elements, the baseplate means could be generally square, with a side dimension approximately equal to twice the maximum outside diameter of one element, or it could be rectangular, one such diameter wide, by four such diameters long. Of course, the latter embodiment would be appropriate also for three or even five elements arranged side-by-side in a single row. In every case, it would be desirable to "round-off" the corners, to minimise unused area.

The inlet/outlet apertures in the casing may be disposed in a variety of ways, some of which are shown in the accompanying drawings and discussed in the associated description. However, as a broad principle, the aperture which communicates directly with the insides of the element can most conveniently be axially-disposed relative to the elements. This gives a "straight through" airflow parth, but more important, it reduces the overall depth of the casing in that axial direction, because it is not necessary to extend the relevant portion of the casing as far as might be needed if the opening in question were to be transversely directed.

The other aperture may also be axially-disposed relative to the elements, for example by making one whole end wall of the casing at least in part of perforated metal. It has also been found to be more convenient in some instances to have the other aperture disposed generally normally with respect to the axes of the filter elements. The other aperture may be in this instance offset with respect to the axes of the elements, so that the air flow is at least in part tangential to the elements.

This minimises the effect of direct impingement on only one element. However, regardless of the exact disposition of the other aperture it is important to note that where the aperture in question is a ducted one, employing a tube instead of a perforated metal sheet, it is appropriate to consider the disclosure of copending application Ser. No. 129,787 of even date. This relates to tilting frustoconical filter elements in such a way as to increase the spacing between the small diameter end of the element and the aperture adjacent thereto. It is preferred that this technology be applied to the air cleaners of the present invention and according to a further aspect of the invention, the axes of the filter elements are tilted so as to increase the spacing between the outsides of the elements and the aperture in the casing communicating therewith, whereby the pressure drop across the cleaner is reduced. As explained in the aforesaid copending application, the reduction in pressure drop is attributable to the elimination, or at least to the significant reduction of air flow swirl around the elements. This is, of course, primarily associated with the use of this particular casing aperture as the inlet to the cleaner. Illustrations of the construction of various air cleaners employing the tilted axis principle are given below.

Attention is directed to copending application Ser. No. 129,786, also of even date. This discloses preferred aspect ratio and included angle parameters for frustoconical filter elements having improved dust holding performance. It is desirable that these preferred parameters be adopted in conjunction with the present invention, so as to achieve optimum element performance.

It will be appreciated that the present invention provides an air cleaner having at least two elements disposed side-by-side. By using relatively small elements in this way, it is possible to produce a compact cleaner, containing a substantial amount of filter paper in a minimum volume.

Figure 2:
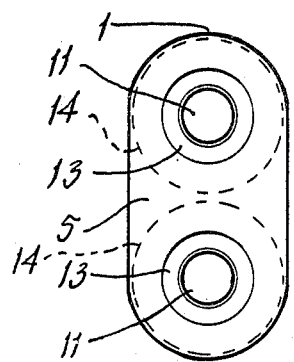
Figure 3:
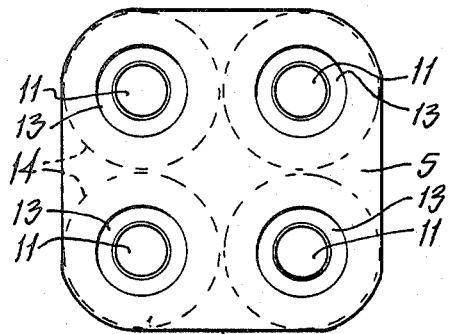

In order that the invention be better understood, several embodiments of it will now be described by way of example with reference to the accompanying drawings in which:

FIG. 1 is a schematic cross-sectional side view of an air cleaner according to the invention, FIG. 2 is an end view of the cleaner of FIG. 1, seen in section on line A of the latter, FIG. 3 is a similar end view in section of a modification of the cleaner of FIG. 1.

Figure 5:
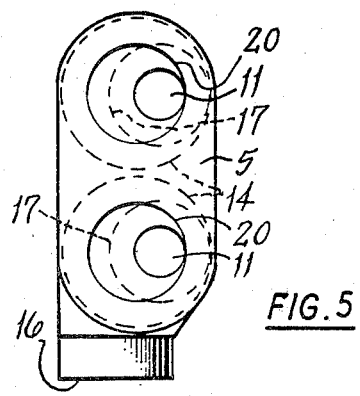
Figure 4:
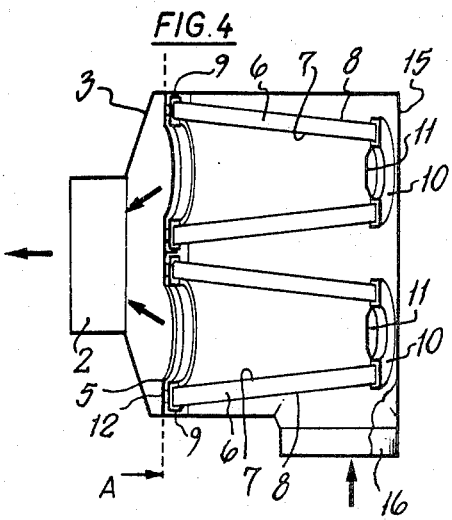
Figure 6:
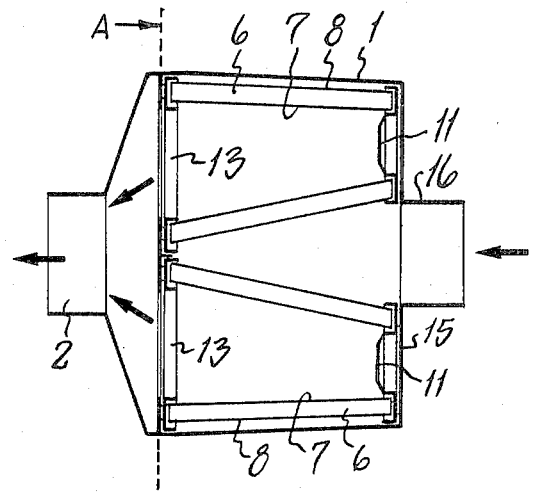
Figures 7, 8:
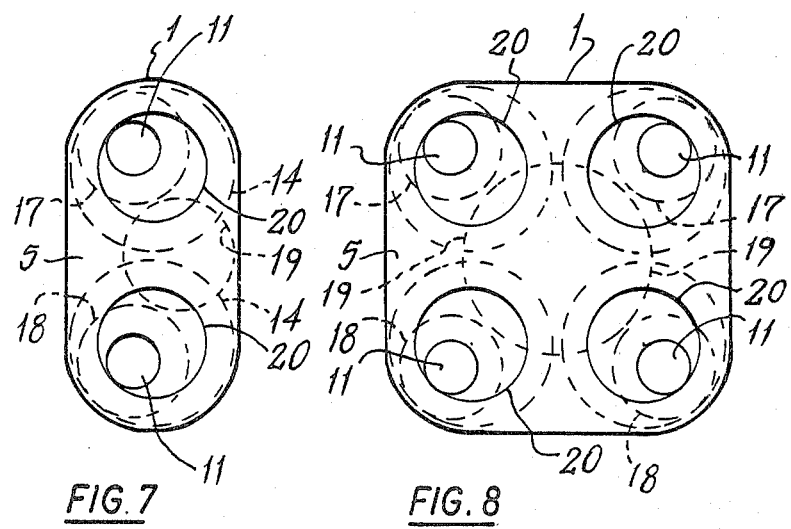

FIG. 4 is a schematic cross-sectional side view of another air cleaner according to the invention, FIG. 5 is an end view of the cleaner of FIG. 4, as seen in section on line A of the latter, FIG. 6 is a schematic cross-sectional side view of yet another air cleaner according to the invention, FIG. 7 is an end view in section of the cleaner of FIG. 6, as seen on line A of the latter, and FIG. 8 is a similar end view in section of a modification of the cleaner of FIG. 7.

Some of the components of the embodiments shown are common to all of the figures and common reference numerals will be used for like parts, as far as is practicable.

Referring firstly to FIG. 1, a generally rectangular metal casing 1 has an aperture 2 in one end wall, 3. The opposite end wall is a perforated metal sheet 4; this end wall 4 is removable to give access to the inside of the casing. This feature is not material to the invention and need not be further described here. Between the two end walls there is a transverse member 5 constituting baseplate means for a pair of frustoconical filter elements. Each element comprises a pleated paper filter element 6 supported between inner and outer perforated metal tubes 7 and 8 respectively. The ends of the elements are adhesively bonded into annular end caps 9 and 10, respectively. The caps 10 include a central blanking plate 11 for closing the end of each element, so that there is no leakage down it. The caps 9 have an annular elastomeric sealing gasket 12. The baseplate means has openings 13 therein, of substantially the same diameter as the inside diameter of the filter element in its widest region. The aperture 2 has a diameter appreciably larger than that of the openings 13, to avoid any possible extra throttling effection the flow. The perforations in end wall 4 constitute the other aperture in the casing, of course. FIG. 2 shows the cleaner as seen in section, looking at the baseplate means 5. The outside diameters of the elements are indicated by dashed lines 14 and the figure illustrates that the area of the baseplate means 5 need only be just enough to accommodate the elements.

FIG. 3 illustrates how four filter elements 14 may be disposed within a casing of generally square cross-section, when viewed in direction A of FIG. 1. In this version there would be four openings 13, of course.

FIG. 4 is generally similar to FIG. 1, but the perforated metal sheet 4 is replaced by a plain end cover plate 15; the perforations themselves are replaced by a duct 16, which is offset with respect to the casing sidewall, as shown in FIG. 5. This is to minimise direct airflow impact on the nearest element to the duct. However, the offset creates instead a tangential airflow and so there is another, more important difference to be noted. Both elements are tilted away from the casing wall, as indicated by dashed lines in FIG. 5, the dashed line 17 showing where the tops of the elements (the apices of the conic sections) are located. This tilt is accomplished by (a) shaping the baseplate means 5 so as to support the elements in the tilted attitude, and (b) profiling the end cover plate 5 to maintain the elements in the desired attitude. Such modification of the casing enables regular elements to be used, as opposed to asymmetric ones. (The margins of the openings 13 are marked 20, to avoid possible confusion, in FIGS. 5, 7 and 8, respectively). Exactly the same principles are applied in FIG. 6, where a ducted aperture is used in the context of an axial "straight-through" flow arrangement. In this example, the duct 16 is in the plain end cover plate 15, but in order to have the maximum possible duct size (for a circular duct, in this instance), the elements are tilted as indicated in FIG. 7. This shows the element apices as dashed circles 17, 18 and the margins of the duct 16 in like manner, by dashed line 19.

FIG. 8 corresponds to FIG. 3, in that it shows how four elements can be arranged for axial, "straight-through" flow, this time using the largest possible circular duct 16. Dashed line 19 indicates the large duct 16 diameter which can be achieved by adopting the tilted element configuration.

Various other possible modifications will be readily apparent from the foregoing examples. For example, the perforated sheet 4 of FIG. 1 may itself be an internal partition inside a somewhat larger casing having an inlet aperture in any desired orientation. This would be at the expense of increased casing size, of course. The arrangement of FIG. 4 is especially valuable for behind-the-cab use in a truck, where the duct 16 can be directed vertically upwards into an intake stack for the cleaner, the duct 2 being then connected to the carburation system by horizontal pipework and the detachable end cover plate 15 being oriented for access from the side of the vehicle. However, this is but one possibility.

As an illustration of the application of the FIG. 4 embodiment, a cleaner was constructed on the basis of a casing approximately 48 cm long, 39 cm wide and 18½ cm deep containing two frustoconical filter elements 38 cm long, 18 cm diameter (wide end) and 15½ diameter (narrow end). The pleated paper filter medium had 130 pleats of depth 3.8 cm. At a throughput of 22 cubic meters/minute the initial pressure drop was 14 cm of water and the dust-holding capacity was about 3600 grams, before the pressure drop became excessive (in excess of 50 cm of water).

I claim:

1. An air cleaner comprising at least two pleated paper filter elements each having the configuration of a frustum of a cone and mounted in side-by-side relation in a casing with their relatively wide diameter ends in sealing relation to a common, impregnable baseplate, means dividing said casing into two discrete portions, said baseplate means having openings defined therein to provide direct communication between one of said portions and the inside of said elements, impermeable means for closing the relatively narrow diameter ends of the elements, an aperture in the casing in each of said portions, and means defined by said casing to direct air entering into said casing tangential to the surface of said filters whereby in use, air entering one of said apertures can pass to the other aperture only through said filter element; said elements and means defined by said casing, being designed, positioned and dimensioned to provide maximum utilizable surface area on said elements while providing a minimum pressure drop through said casing.

2. The cleaner of claim 1 wherein the aperture in the casing which communicates directly with the insides of the elements is used as the outlet from the cleaner.

3. The cleaner of claim 1 wherein the elements are substantially identical.

4. The cleaner of any one of claims 1, 2 and 3, wherein the openings in the baseplate means are at least as large as the inside diameter of the end of the filter elements adjacent thereto.

5. The cleaner of claim 3 wherein the baseplate means is generally rectangular and of dimensions determined by the maximum diameter of an element and the number of elements.

6. The cleaner of claim 1 wherein the aperture in the casing which communicates directly with the insides of the elements is used as the outlet from the cleaner, and has a diameter at least equal to one of the openings in the baseplate means and also is generally axially directed with respect to said elements.

7. The cleaner of claim 6 wherein the inlet to the casing is also axially directed relative to the elements.

8. The cleaner of claim 6 wherein the inlet to the casing is normal to the axis of the elements.

9. The cleaner of claim 7 or claim 8 wherein the axes of the filter elements are tilted away from said inlet to the casing, whereby the radial clearance between said elements and said inlet is increased without increasing the size of the casing.

* * * * *